(12) United States Patent
Peng et al.

(10) Patent No.: US 12,197,179 B2
(45) Date of Patent: Jan. 14, 2025

(54) NON-INTRUSIVE LOAD DECOMPOSITION METHOD BASED ON INFORMER MODEL CODING STRUCTURE

(71) Applicant: Zhejiang University, Hangzhou (CN)

(72) Inventors: Yonggang Peng, Hangzhou (CN); Jiayuan Ling, Hangzhou (CN); Jun Chen, Hangzhou (CN)

(73) Assignee: Zhejiang University, Hangzhou (CN)

( * ) Notice: Subject to any disclaimer, the term of this patent is extended or adjusted under 35 U.S.C. 154(b) by 383 days.

(21) Appl. No.: 17/750,056

(22) Filed: May 20, 2022

(65) Prior Publication Data

US 2022/0397874 A1    Dec. 15, 2022

(30) Foreign Application Priority Data

Jun. 7, 2021   (CN) .......................... 202110629468.7

(51) Int. Cl.
  *G05B 19/00*   (2006.01)
  *G05B 19/042*  (2006.01)
  *G06N 20/00*   (2019.01)

(52) U.S. Cl.
  CPC .......... *G05B 19/042* (2013.01); *G06N 20/00* (2019.01); *G05B 2219/2639* (2013.01)

(58) Field of Classification Search
  None
  See application file for complete search history.

(56) References Cited

U.S. PATENT DOCUMENTS

2021/0149441 A1*  5/2021  Bartscherer ........... G06F 1/1616
2021/0192714 A1*  6/2021  Bhatt ....................... G06T 7/11

OTHER PUBLICATIONS

Yue, Z. et al., Bert4NILM: A Bidirectional Transformer Model for Non-Intrusive Load Monitoring, NILM' 20, Virtual Event, Japan, Nov. 18, 2020, 5 pages.
Zhou, H. et al., Informer: Beyond Efficient Transformer for Long Sequence Time-Series Forecasting, asXiv, Dec. 17, 2020, 14 pages.

* cited by examiner

*Primary Examiner* — Paul B Yanchus, III

(57) ABSTRACT

The present disclosure relates to non-intrusive load decomposition techniques, and aims at providing a non-intrusive load decomposition method based on an Informer model coding structure. The method includes: preprocessing power data in electricity loads, and forming sample pairs according to a time sequence of total power and a time power sequence of a single electricity load; building a training model with reference to an Informer model, the training model including a feature extraction part, a feature processing part, and a feature mapping part which are arranged in sequence; initializing parameters of the training model, and selecting an appropriate activation function and loss function; training the training model using preprocessed sample data; and inputting a total power curve to the trained model, and conducting decomposition to obtain a power curve of a single load.

11 Claims, 6 Drawing Sheets

NON-INTRUSIVE LOAD DECOMPOSITION METHOD BASED ON INFORMER MODEL CODING STRUCTURE

CROSS REFERENCE TO RELATED APPLICATION

This patent application claims the benefit and priority of Chinese Patent Application No. 202110629468.7, filed on Jun. 7, 2021, the disclosure of which is incorporated by reference herein in its entirety as part of the present application.

TECHNICAL FIELD

The present disclosure relates to the field of non-intrusive load decomposition, and in particular to a non-intrusive load decomposition method based on an Informer model coding structure.

BACKGROUND ART

In recent years, building Internet of Energy (IoE) has become an increasingly hot topic, which has received much attention from numerous researchers. Energy management is the vital first step in achieving energy connection, with a particular focus on monitoring and controlling loads, and reasonably optimizing energy configuration to achieve the purposes of saving energy and reducing energy consumption. Traditional load monitoring methods usually adopt intrusive means, which, despite the advantage of delivering accurate data, have some disadvantages, such as poor practical operability, high implementation cost, and low users' acceptability. For this reason, non-intrusive load decomposition has long been favored by most researchers.

The non-intrusive load decomposition method mainly includes collecting electrical information data of a power load entrance, and decomposing the electricity demand of a single electricity load, which has been one of the most economical and clean data acquisition methods in the prior art. An existing non-intrusive decomposition method obtains final decomposition results mainly using event detection, feature extraction, load identification, load decomposition and other processes. In such method, errors will add up throughout each process step, leading to low decomposition accuracy of a relatively complex load. Existing methods with high decomposition accuracy are mainly non-intrusive load decomposition methods based on deep learning.

For the past few years, deep learning algorithm has proven its capability of solving complex problems in a wide range of applications, such as voice recognition and machine vision. Therefore, researchers have begun to introduce into non-intrusive load decomposition deep learning algorithms, including automatic encoders, convolution neural networks, cyclic neural networks and so on, to better realize load identification and load decomposition. However, there are still some problems in deep learning-based methods, such as low generalization ability of the model, the imbalance of training data, and low comprehensiveness of evaluation indexes, and a lot of studies are required to solve these problems.

SUMMARY

The technical problem to be solved by the present disclosure is to overcome the deficiencies of the prior art, and to provide a non-intrusive load decomposition method based on an Informer model coding structure.

To solve the technical problem, the present disclosure adopts the following solution:

The present disclosure provides a non-intrusive load decomposition method based on an Informer model coding structure, including the following steps:

(1) Decomposing electricity demand of a single electricity load from collected electrical information data using the non-intrusive load decomposition method; and preprocessing power data in the electricity loads, and forming sample pairs according to a time sequence of total power and a time power sequence of a single electricity load.

In the present disclosure, the low-frequency power data with a frequency less than 1 Hz is preferred power data of electricity loads. The reason for choosing low-frequency data is that generally, high-frequency data is hardly accessible, and may incur high cost of storage and transmission. In fact, it is not limited to low-frequency data for the implementation of the present disclosure, if the difficulty and cost of acquiring high-frequency data are not taken into account. In addition, given that the object under model training and processing in the present disclosure is the power data of electrical equipment, the national and regional differences of the voltage and current in the power supply network or electrical equipment will not affect the implementation of the present disclosure. The present disclosure does not specify any special application scene expect that data needs to be acquired in advance.

(2) Building a training model with reference to an Informer model in the field of natural language processing, the training model including a feature extraction part, a feature processing part, and a feature mapping part which are arranged in sequence; where, in the feature extraction part, an original sequence with an input length L and a dimension 1 is subject to feature extraction through a one-dimensional convolutional layer and a maximum pooling layer to obtain a feature graph matrix; and then position embedding is conducted, that is, a position feature matrix with a same shape is calculated according to feature graphs; and the two matrices are added to finally obtain a feature matrix with a length L and a dimension d;

in the feature processing part, block structures simplified based on an Informer model coding part are stacked, and sub-stack parts of the original coding part in an Informer model are discarded; in each of the block structures, the first layer is a self-attention layer, which is connected to a positional fully-connected feedforward network, and the last layer is an extraction layer (the length of the feature matrix can be reduced by ½ through the extraction layer); stacking is conducted three times in this way, and an extraction layer of the third block structure is discarded; after the processing by the feature processing part, the length of the feature matrix changes to L/4, and the dimension is kept at d; and in the feature mapping part, through a one-dimensional transposed convolutional layer, the length of the feature matrix is restored to L, the dimension is kept unchanged, and then through two fully-connected layers, the dimension is reduced to d/2 and 1, respectively, and finally, an output sequence with a length L and a dimension 1 is obtained;

(3) initializing parameters of the training model, and selecting an appropriate activation function and loss function;

(4) training the training model using preprocessed sample data; and (5) inputting a total power curve to the trained model, and conducting decomposition to obtain a power curve of a single load.

Further, in the step (2), the position feature matrix with the same dimension as the feature graph matrix is obtained by conducting position embedding on the feature graph matrix according to the following calculation formula:

$$PE(pos,2i)=\sin(pos/10000^{2i/d})$$

$$PE(pos,2i+1)=\cos(pos/10000^{2i/d})$$

where in this formula, d denotes the dimension of the feature matrix, 2i and 2i+1 denote an even position and an odd position in dimension, respectively, and pos denotes a position in an original sequence.

Further, in the step (2), the self-attention layer of each of the block structures includes a multi-head ProbSparse self-attention layer; random inactivation is conducted on the multi-head ProbSparse self-attention layer using dropout, then residual connection is conducted (to prevent the degeneration of a weight matrix and improve the representational capacity of a network), and finally, normalization is conducted in a LayerNorm layer.

Further, in the multi-head ProbSparse self-attention layer, an attention mechanism adopts the following calculation formula:

$$\text{Attention }(Q, K, V) = softmax\left(\frac{\overline{Q}K^T}{\sqrt{d}}\right)V$$

where in this formula, Q, K, and V are abbreviations of Query, Key, and Value, respectively, Query denotes a query item, Key denotes a corresponding key item, and Value denotes a value item to be weighted and averaged; in a self-attention mechanism, Q, K, and V are the same, and denote an input matrix of the multi-head ProbSparse self-attention layer, and d denotes dimensions of Query and Key; $\overline{Q}$ is a sparse matrix with the same size as Query, and part of Query is selected through Query sparsity evaluation to constitute a matrix; and superscript T means transposition.

The reason is that the results of $QK^T$ are sparse, only some matrix operations of Query and Key have a main effect on the results, while other operations can be ignored or do not affect the performance of the model. This method greatly reduces the time and space complexity of an attention model algorithm.

Further, the Query sparsity evaluation adopts the following calculation formula:

$$\bar{M}(q_i, K) = \max_j\left\{\frac{q_ik_j^T}{\sqrt{d}}\right\} - \frac{1}{L_K}\sum_{j=1}^{L_K}\frac{q_ik_j^T}{\sqrt{d}}$$

where in this formula, $L_K$ denotes the number of rows of the key matrix, $q_i$ and $k_j$ denote the i-th row and j-th row of the query matrix and key matrix, respectively, d denotes the dimensions of the query matrix and key matrix, namely the number of columns, and superscript T means transposition.

On this basis, the multi-head ProbSparse self-attention layer adopts the following calculation formula:

$$\text{MultiHead}(Q,K,V)=\text{Concat}(\text{head}_1, \ldots, \text{head}_h)W^O$$

$$\text{head}_i=\text{Attention}(QW_i^Q, KW_i^K, VW_i^V)$$

$$i=1,2 \ldots ,h$$

where W denotes a linear mapping matrix, different $(W_i^Q, W_i^K, W_i^V)$ map inputs to different spaces, and then mapped matrices are separately used to calculate attention functions and obtain heads; and after attention function outputs calculated by multiple heads are spliced together, the spliced function is mapped to an output through a linear transformation matrix $W^O$ Further, in the step (2), the positional fully-connected feedforward network of the block structure includes two convolutional layers with a kernel size of 1, where the first convolutional layer maps results of the self-attention layer to a feature space of a larger dimension such that the dimension changes to 4×d, and GELU is taken as an activation function; the second convolutional layer restores an output dimension to d; and for each convolutional layer, random inactivation is conducted using dropout, then residual connection is conducted, and finally, normalization is conducted in a LayerNorm layer.

Further, in the step (2), the extraction layer of the block structure includes a one-dimensional convolutional layer and a maximum pooling layer; and after being processed by the extraction layer, an output length of the feature matrix changes to one half of an input length (the design of the extraction layer enables the model to focus more on important features and discard redundant features produced by ProbSparse Self-attention mechanism).

Further, the extraction layer adopts the following calculation formula:

$$X_{j+1}^t=\text{MaxPool}(ELU(\text{Conv1}d([X_j^t]_{AB})))$$

where in this formula, j denotes the number of layers, $[\bullet]_{AB}$ denotes calculation operation through the Multi-Head ProbSparse Self-attention layer, Conv1d(•) denotes one-dimensional convolution in time dimension, with a convolution kernel of 3 in size, ELU(•) denotes an activation function, a stride of maximum pooling is 2, and superscript t denotes the t-th input matrix.

Further, in the step (2), a convolution kernel used in the one-dimensional transposed convolutional layer of the feature mapping part has a size of 6, a stride of 4, and a padding of 1, and is able to enlarge a length of a sequence obtained at a preceding stage by 4 times to restore to the size of an original input sequence.

Further, in the step (3), the loss function for the training model adopts the following calculation formula:

$$L(x, s) = \frac{1}{T}\sum_{i=1}^{T}(\hat{x}_i - x_i)^2 + D_{KL}\left(softmax\left(\frac{\hat{x}}{\tau}\right)\|softmax\left(\frac{x}{\tau}\right)\right) + \frac{1}{T}\sum_{i=1}^{T}\log(1+\exp(-\hat{s}_is_i)) + \frac{\lambda}{T}\sum_{i \in O}|\hat{x}_i - x_i|$$

where in this formula, $\hat{x}$, $x \in [0,1]$ denote normalized model output and actual power, respectively; $\hat{s}, s \in \{-1,1\}$ denote a forecast on-off state and actual state of target equipment; T denotes a time step of a sequence, and O denotes a time step satisfying the condition that the actual on-off state of a load is "on" or the model state forecast goes "wrong"; τ denotes an amplification coefficient which is set to be 0.1; and λ denotes a penalty coefficient, and an empirical value is taken according to different loads.

In the calculation formula of the loss function, there are four parts connected by three + signs, where the first term is a commonly-used mean square error (MSE) loss function, the second term is Kullback-Leibler Divergence (KL divergence) loss used to measure a difference between a forecast value and an actual value, the third term is penalty for the wrong on-off state forecast, and the last term is L1 term calculated on a time step of a state when equipment is actually turned on or model state forecast goes wrong, which is a penalty term against a smaller forecast value of the model. Although oscillation may occur during training, reasonable settings can improve the performance of the model, where λ varies depending on different loads.

Further, in the step (4), masking is conducted on input data during model training to force the model to learn and forecast masked data, so as to enhance the capability of the model to capture important modes.

Taking the masking ratio of 10% as an example, 10% of the input data is randomly selected for processing. Regarding the randomly selected data, 80% is set to −1, 10% is set to a random value, and 10% is kept unchanged. Further, through masking processing, the model is forced to learn and forecast masked data, which enhances the capability of the model to capture important modes.

The present disclosure further provides a system for non-intrusive load decomposition, including an input module, a training model and an output module which are connected in sequence; where the training model includes a feature extraction part, a feature processing part, and a feature mapping part which are arranged in sequence, where the feature processing part is transformed from an Informer model by simplifying and stacking an encoder structure in the Informer model; where, the feature extraction part includes a one-dimensional convolutional layer, a maximum pooling layer, a position embedding module and a matrix addition module;

the feature processing part is implemented by stacking block structures simplified based on an Informer model coding part, and discarding sub-stack parts of the original coding part in an Informer model; the block structures each includes a self-attention layer, a positional fully-connected feedforward network, and an extraction layer which are arranged in sequence; stacking is conducted three times in this way, and an extraction layer of the third block structure is discarded; and the feature mapping part includes a one-dimensional transposed convolutional layer and two fully-connected layers.

Compared with the prior art, the present disclosure has the following advantages and beneficial effects:

1. The present disclosure introduces an Informer model for Long Sequence Time-Series Forecasting, and applies the improved Informer model to the field of non-intrusive load decomposition. In this way, while improving the long-term dependence of a model on input and output, the present disclosure reduces the occupancy of the memory space by the model and the complexity in time calculation, and improves the accuracy of the non-intrusive load decomposition at the same time.

2. Based on the Informer model in the field of natural language processing, the present disclosure stacks part of the structure of the Informer model into blocks and applies the block structures to the field of non-intrusive load decomposition. Employing the excellent performance of Informer model in dealing with long sequences, the method has superior decomposition performance for electricity loads with long operational cycles and multiple states over most decomposition methods; at the same time, the fitting degree of decomposition curves for low-power electricity loads is high; in the case of sufficient data volume, the decomposition performance of the model can be further improved, and the complexity in time calculation and space storage of this model is less than those of common similar Transformer models.

DETAILED DESCRIPTION OF THE EMBODIMENTS

First of all, it should be noted that the present disclosure relates to database and deep learning technology, and relates to the application of computer technology in electric power energy control technology. During the implementation of the present disclosure, the application of a plurality of software function modules will be involved. The Applicant holds that after carefully reading the application documents and accurately understanding the implementation principle and the objective of the present disclosure, those skilled in the art can completely achieve the present disclosure by applying their software programming skills in combination with existing well-known techniques. All mentioned in the application document of the present disclosure fall into this category, and the Applicant will not enumerate all of them herein.

The present disclosure will be further described below with the accompanying drawings. It should be noted that the examples are implemented on the premise of the technical solution and provide the detailed implementations and specific operation processes, but the protection scope of the present disclosure is not limited to the following examples.

Figure 1:
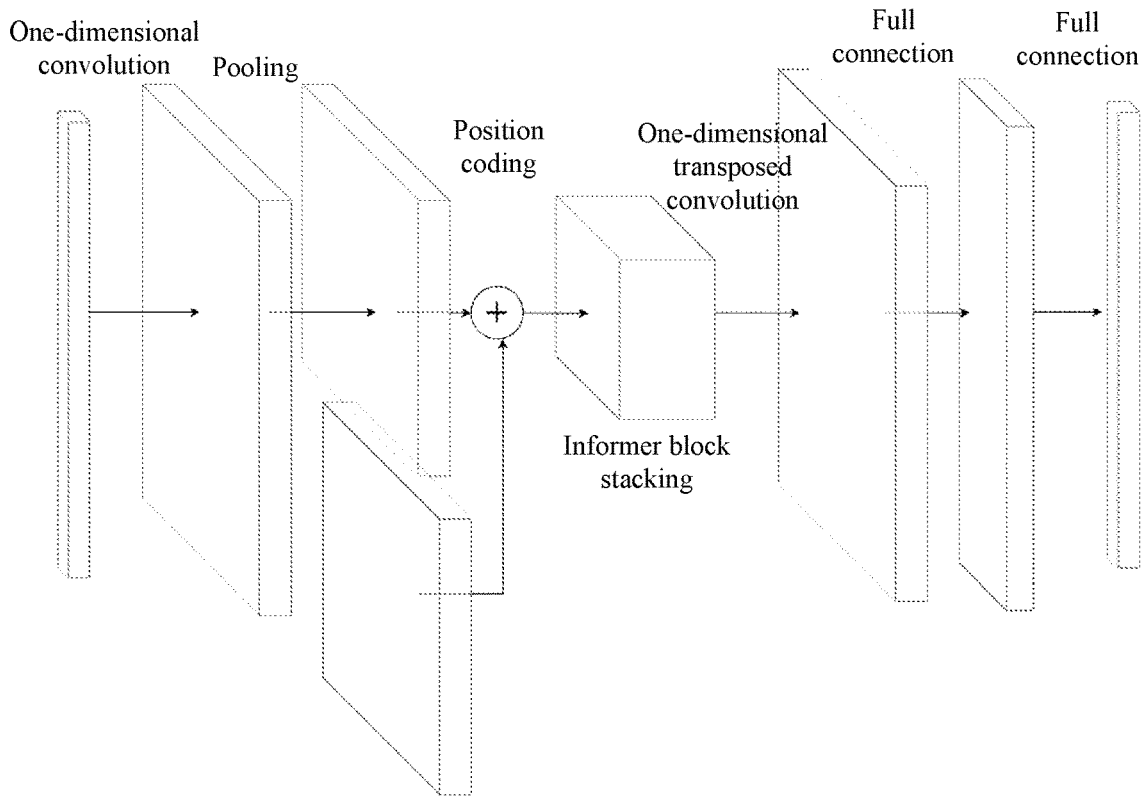
FIG. 1 is a diagram illustrating an overall structure of a model.
Figure 2:
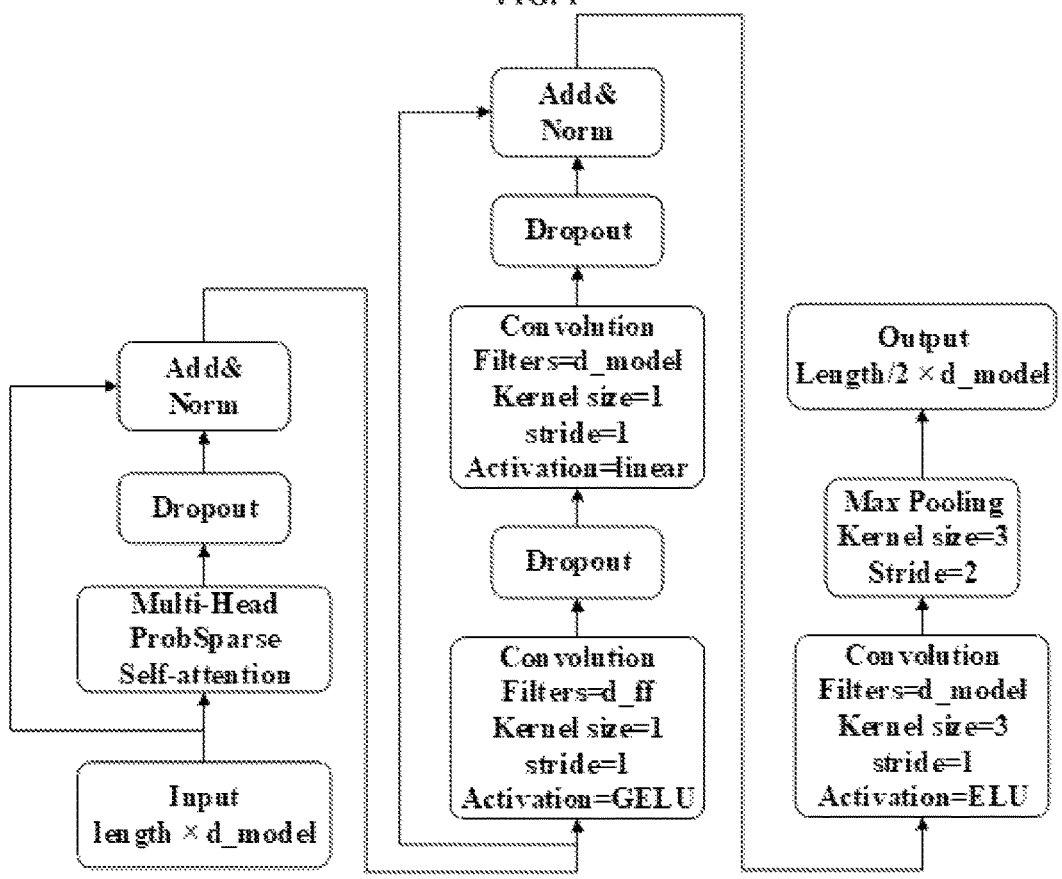
FIG. 2 is a diagram of a block structure based on an Informer model.
Figure 3:
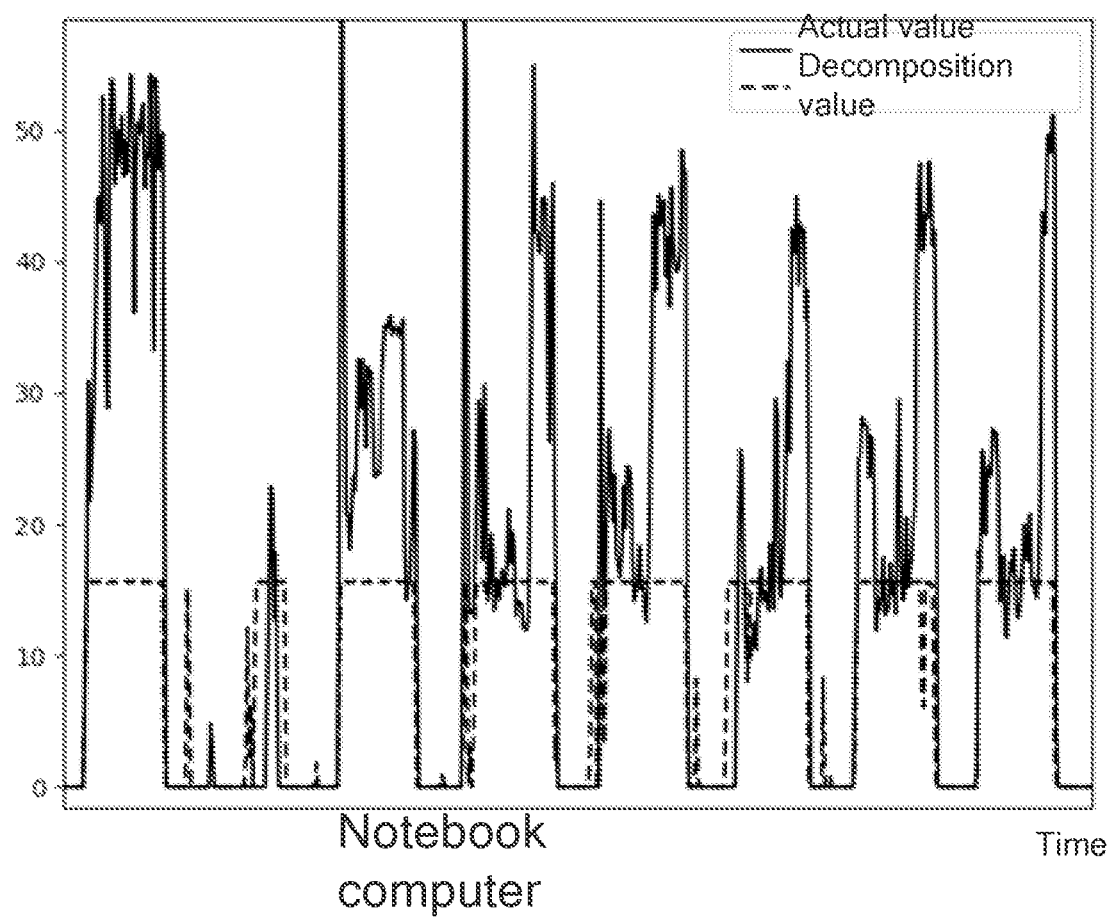
FIGS. 3-7 are decomposition effect diagrams of five kinds of electrical models.
Figure 4:
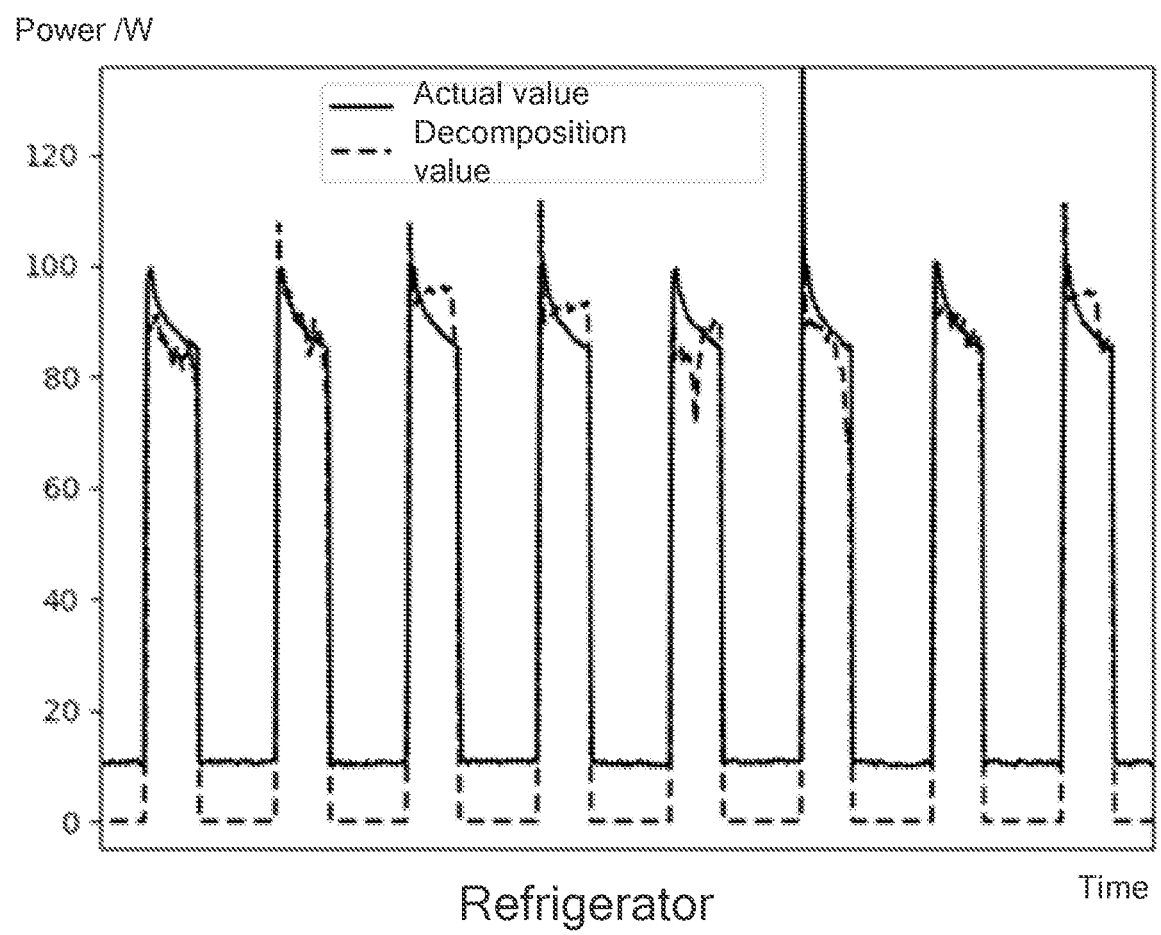
Figure 5:
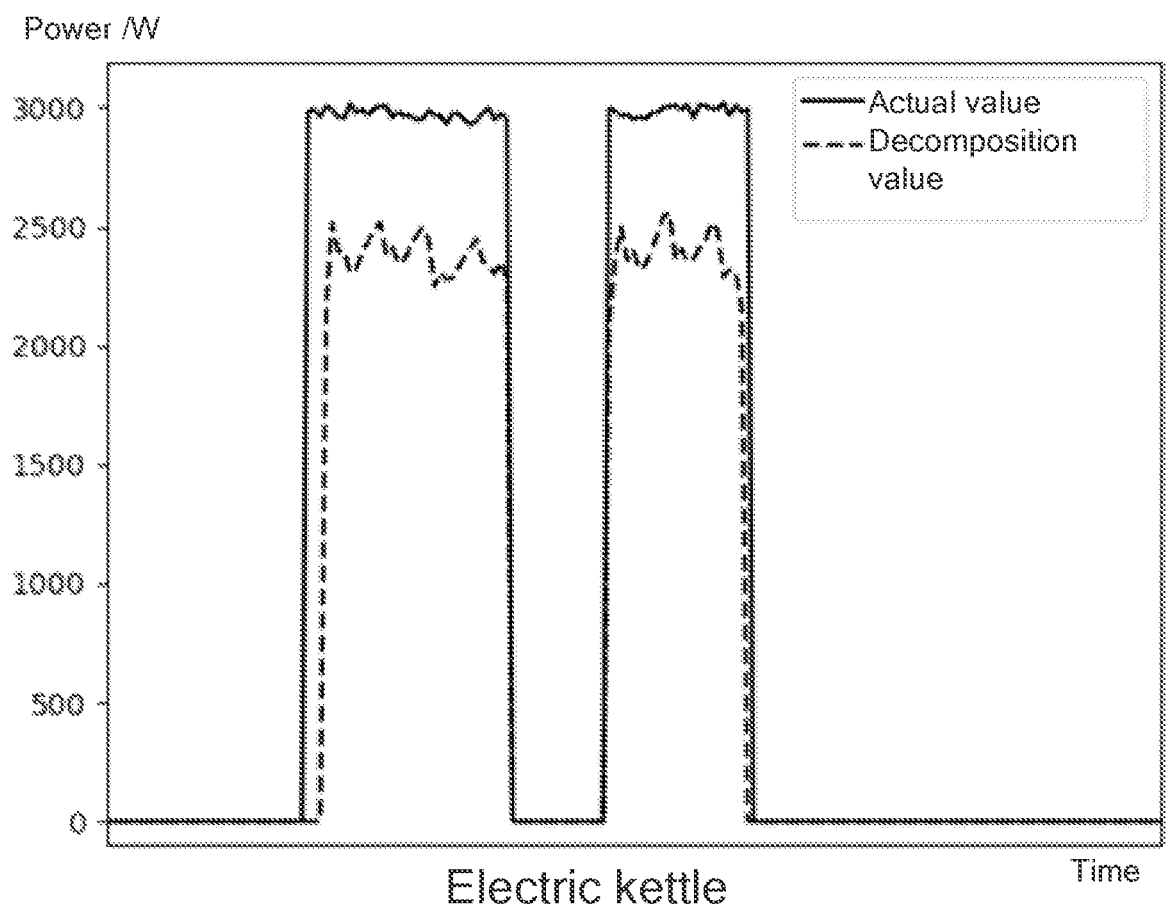
Figure 6:
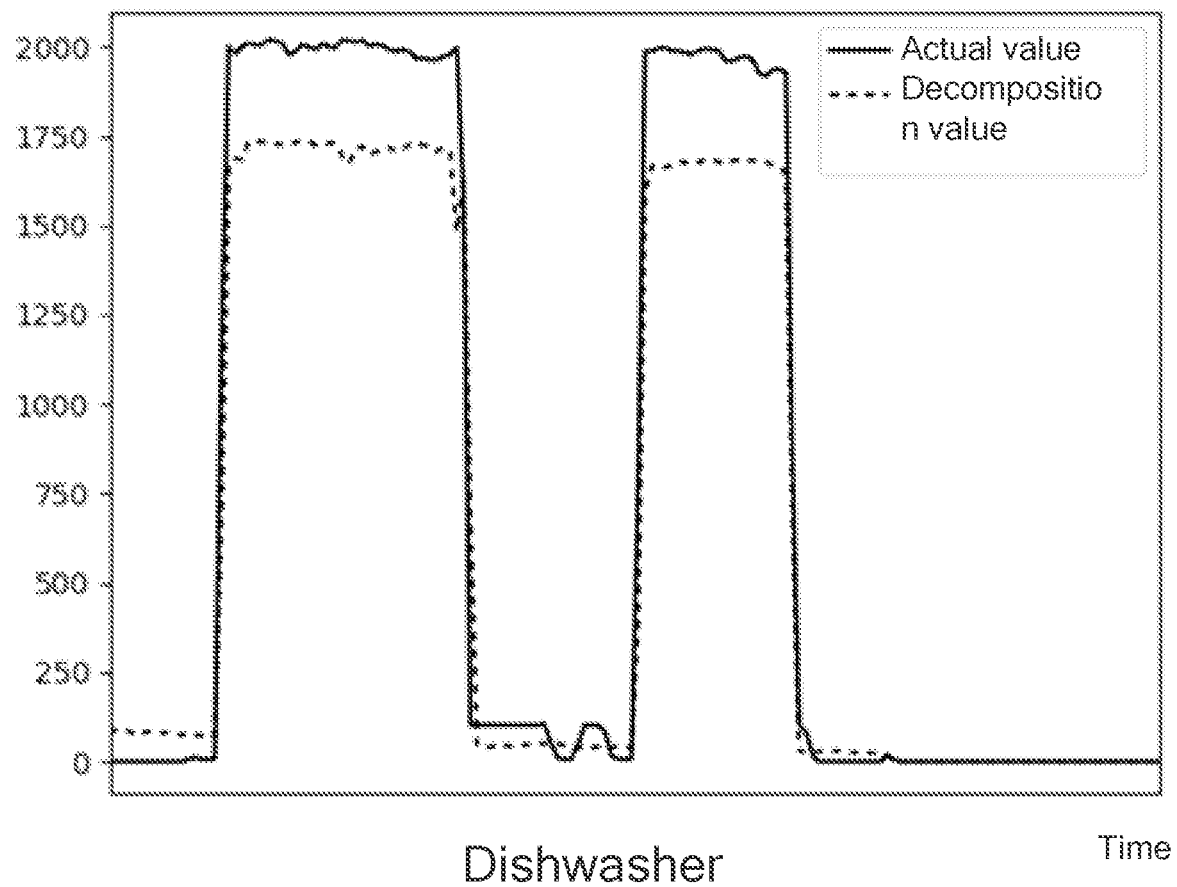
Figure 7:
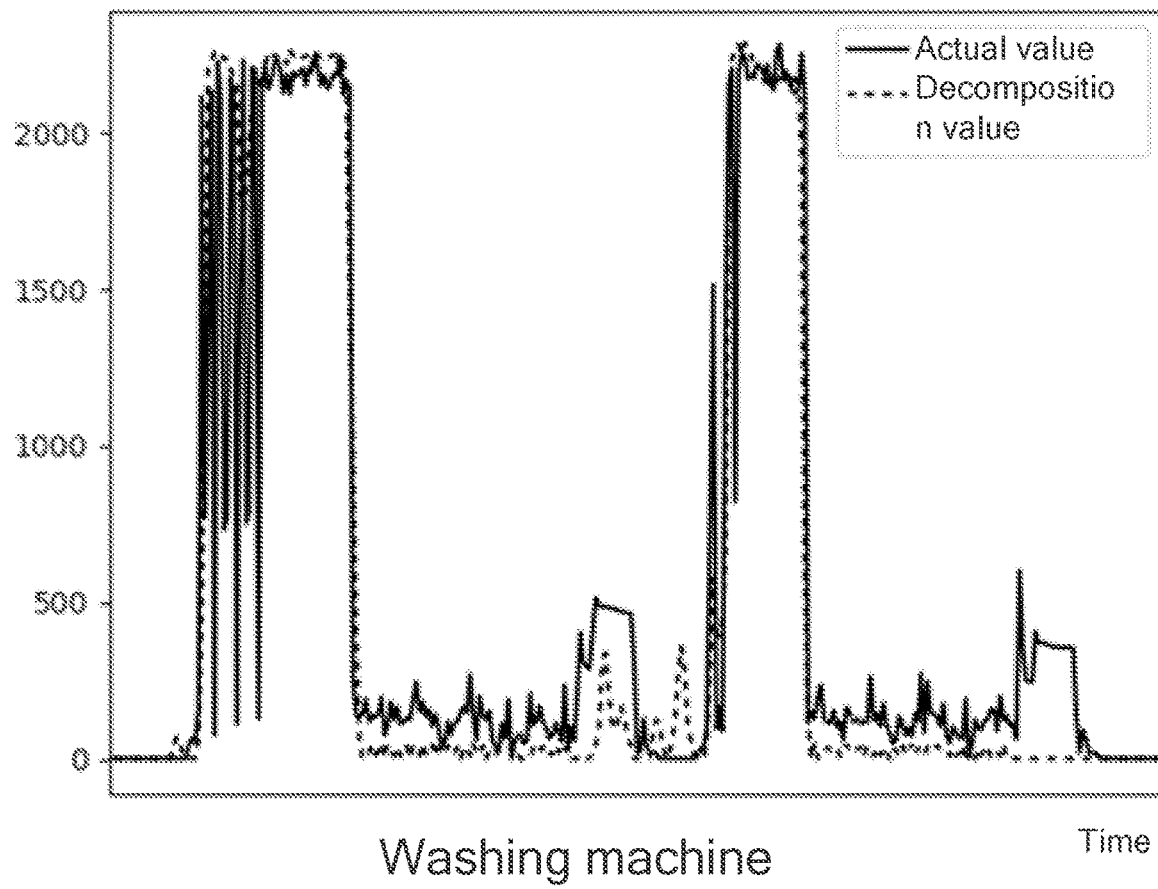

FIG. 1 is a diagram illustrating an overall structure of a built model, and FIG. 2 is a diagram of a block structure based on an Informer model.

In the present disclosure, an Informer model in the field of natural language processing (such as record in the document "Informer: Beyond Efficient Transformer for Long Sequence Time-Series Forecasting") is selected, and based thereupon, block structures are transformed; in this way, the transformed model can maintain the excellent performance of long sequence processing, and at the same time reduce the occupancy of memory space and complexity in time calculation.

In this embodiment, UK-DALE dataset is taken as a research object. UK-DALE is an open-access dataset written by Kelly and published by UK Energy Research Centre Energy Data Centre. It was recorded from five UK houses in terms of the electricity demand for a long period. In this embodiment, low-frequency data is selected from this dataset to form a dataset, with a sampling frequency of ⅙ Hz.

In this embodiment, five kinds of electrical appliances in the dataset such as dishwasher, refrigerator, electric kettle, washing machine and notebook computer are selected as the research object, the data of the second house collected for one week is selected as the test object, and all the data of other houses is selected as the training object. The model in this embodiment is implemented in an environment of Python 3.6 and Pytorch 1.4, and is trained and tested on two pieces of NvidiaGTX1080Ti GPU for a time period ranging from several hours to two days.

This embodiment is specifically implemented according to the following steps:

S1. preprocessing the low frequency data, where all the data of the five kinds of selected electrical appliances in 5 houses are extracted, including the total apparent power data and the active power data of a single electricity load, and is cleaned to remove the empty data and extreme outliers that have not been collected, and afterwards, the data is aligned according to a time sequence to form sample pairs;

S2. building a training model, the model including mainly the following three parts: a feature extraction part, where an original sequence with an input length L and a dimension 1 is subject to feature extraction through a one-dimensional convolutional layer and a maximum pooling layer to obtain a feature graph matrix, then position embedding is conducted, that is, a position feature matrix with a same shape is calculated according to the feature graphs, the two matrices are added, and finally a feature matrix with a length L and a dimension d is obtained; a feature processing part, the feature processing part being formed by stacking the block structures based on an Informer model coding part, where in each of the block structures, the first is the self-attention layer, which is connected to a positional fully-connected feedforward network, and the last layer is an extraction layer which is able to reduce the length of the feature matrix by ½, in this model, the block structures are stacked three times, and an extraction layer in the third block structure is discarded, such that through the feature processing part, the length of the feature matrix changes to L/4, and the dimension is kept at d; a feature mapping part, where through a one-dimensional transposed convolutional layer, the length of the feature matrix is restored to L, and the dimension is kept unchanged, and then through two fully-connected layers, the dimension is reduced to d/2 and 1, respectively, and finally an output sequence with a length L and a dimension 1 is obtained; the overall structure of the model is shown in FIG. 1, and the block structure based on an Informer model in the training model is shown in FIG. 2, in which the specific parameters are also labeled;

S3. initializing the parameters of the model, where the length of the input sequence is set to be 320 or 480 depending on different loads, the masking proportion is 20%, the kernel size of one-dimensional convolution is 5, the number of kernels is 256, the step size is 1, the activation function is a linear function, pooling is maximized, and the shape of the sequence is kept unchanged before and after pooling; after being processed by the informer block structures, the length of the sequence is shortened to ¼ of the original length, the dimension is kept at 256, and the length can be restored by one-dimensional transposed convolution; a convolution kernel used in one-dimensional transposed convolution has a size of 6, a stride of 4, and a padding of 1, the number of kernels is 256, then through two fully-connected layers, the dimensions of the sequence are reduced to 128 and 1 successively, and a sequence the same as the output is obtained;

S4. inputting sample data from a preprocessed training set into the model to train the model iteratively, where the batch size of the training is 64, the number of iterations is 10, the learning rate is 1e-4, and Adam is selected as an optimizer; and S5. inputting total power data in a testing set into the trained model, and conducting decomposition to obtain a power curve of a single load. The results are shown in FIGS. 3-7.

In order to evaluate the decomposition performance of the model, three representative indexes are selected in this embodiment, namely, $F_1$ score, Mean Absolute Error (MAE), and Signal Aggregate Error (SAE), respectively. The $F_1$ score is calculated based on the on-off state. Specifically, the score is calculated by judging whether a load is on or off according to a set threshold, and then comparing the state in a model output sequence with an actual state. The calculation formula of $F_1$ is as follows:

$$F_\beta = (1+\beta^2)\frac{PR \times \text{recall}}{(\beta^2 \times PR) + \text{recall}}$$

where, PR denotes a precision rate, recall denotes a recall rate, β shows the different emphasis on the precision rate and the recall rate, β=1 denotes the harmonic average of the precision rate and the recall rate, and $F_1$ score is obtained when the two have the equal weight;

the calculation formulas of the other two indexes are as follows:

$$MAE = \frac{1}{T}\sum_{t=1}^{T}|\hat{y}_t - y_t|$$

$$SAE = \frac{|\hat{E} - E|}{E}$$

where, ŷ denotes a power sequence of the model decomposition output, y denotes an actual power sequence of the load, Ê denotes power consumption within a period of time obtained by model decomposition, and E denotes actual power consumption of the load within this period of time.

Table 1 shows some parameter settings of a load selected in the algorithm, which are used to confirm the on-off state of the load.

TABLE 1

Parameter settings of load

| Load | Maximum power | Minimum startup power/W | Minimum startup time/s | Minimum shutdown time/s |
|---|---|---|---|---|
| Refrigerator | 300 | 50 | 60 | 12 |
| Dishwasher | 2500 | 10 | 1800 | 1800 |
| Electric kettle | 3100 | 2000 | 12 | 0 |
| Notebook computer | 500 | 15 | 30 | 120 |
| Washing machine | 2500 | 20 | 1800 | 160 |

Table 2 shows the decomposition performance index of the model on test data.

TABLE 2

Performance index of the model regarding load decomposition

| Equipment | $F_1$ Score | MAE | SAE |
|---|---|---|---|
| Refrigerator | 0.821 | 22.110 | 0.283 |
| Dishwasher | 0.886 | 15.056 | 0.124 |
| Electric kettle | 0.889 | 10.186 | 0.350 |

TABLE 2-continued

Performance index of the model regarding load decomposition

| Equipment | $F_1$ Score | MAE | SAE |
| --- | --- | --- | --- |
| Notebook computer | 0.657 | 7.074 | 0.541 |
| Washing machine | 0.626 | 5.325 | 0.014 |

Among them, the index $F_1$ score and index MAE evaluate the accuracy of the model in load decomposition at every time step, which is visually presented as the degree to which the power curve of model output fits in with the actual power curve of the load, while SAE represents the gap between the total power consumption of model output and the actual power consumption over a period of time.

What is claimed is:

1. A non-intrusive load decomposition method based on an Informer model coding structure, comprising the following steps:
   (1) decomposing electricity demand of electricity loads from collected electrical information data using the non-intrusive load decomposition method; and preprocessing power data in the electricity loads, and forming sample pairs according to a time sequence of total power and a time power sequence of a single electricity load;
   (2) building a training model with reference to an Informer model in the field of natural language processing, the training model comprising a feature extraction part, a feature processing part, and a feature mapping part which are arranged in sequence, wherein,
   in the feature extraction part, an original sequence with an input length L and a dimension 1 is subject to feature extraction through a one-dimensional convolutional layer and a maximum pooling layer to obtain a feature graph matrix; and then position embedding is conducted, that is, a position feature matrix with a same shape is calculated according to feature graphs; and the two matrices are added to finally obtain a feature matrix with a length L and a dimension d;
   in the feature processing part, block structures simplified based on an Informer model coding part are stacked, and sub-stack parts of the original coding part in an Informer model are discarded; in each of the block structures, the first layer is a self-attention layer, which is connected to a positional fully-connected feedforward network, and the last layer is an extraction layer; stacking is conducted three times in this way, and an extraction layer of the third block structure is discarded; after the processing by the feature processing part, the length of the feature matrix changes to L/4, and the dimension is kept at d; and
   in the feature mapping part, through a one-dimensional transposed convolutional layer, the length of the feature matrix is restored to L, the dimension is kept unchanged, and then through two fully-connected layers, the dimension is reduced to d/2 and 1, respectively, and finally, an output sequence with a length L and a dimension 1 is obtained;
   (3) initializing parameters of the training model, and selecting an appropriate activation function and loss function;
   (4) training the training model using preprocessed sample data; and
   (5) inputting a total power curve to the trained model, and conducting decomposition to obtain a power curve of a single load.

2. The method according to claim 1, wherein in the step (2), the position feature matrix with the same dimension as the feature graph matrix is obtained by conducting position embedding on the feature graph matrix according to the following calculation formula:

$PE(pos,2i) = \sin(pos/10000^{2i/d})$ $PE(pos,2i+1) = \cos(pos/10000^{2i/d})$ wherein in this formula, d denotes the dimension of the feature matrix, 2i and 2i+1 denote an even position and an odd position in dimension, respectively, and pos denotes a position in an original sequence.

3. The method according to claim 1, wherein in the step (2), the self-attention layer of each of the block structures comprises a multi-head ProbSparse self-attention layer; and random inactivation is conducted on the multi-head ProbSparse self-attention layer using dropout, then residual connection is conducted, and finally, normalization is conducted in a LayerNorm layer.

4. The method according to claim 3, wherein in the multi-head ProbSparse self-attention layer, an attention mechanism adopts the following calculation formula:

$$\text{Attention}(Q, K, V) = \text{softmax}\left(\frac{\overline{Q}K^T}{\sqrt{d}}\right)V$$

wherein in this formula, Q, K, and V are abbreviations of Query, Key, and Value, respectively, Query denotes a query item, Key denotes a corresponding key item, and Value denotes a value item to be weighted and averaged; in a self-attention mechanism, Q, K, and V are the same, and denote an input matrix of the multi-head ProbSparse self-attention layer, and d denotes dimensions of Query and Key; $\overline{Q}$ is a sparse matrix with the same size as Query, and part of Query is selected through Query sparsity evaluation to constitute a matrix; and superscript T means transposition.

5. The method according to claim 4, wherein the Query sparsity evaluation adopts the following calculation formula:

$$\overline{M}(q_i, K) = \max_j \left\{ \frac{q_i k_j^T}{\sqrt{d}} \right\} - \frac{1}{L_K} \sum_{j=1}^{L_K} \frac{q_i k_j^T}{\sqrt{d}}$$

wherein in this formula, $L_x$ denotes the number of rows of the key matrix, $q_i$ and $k_j$ denote the i-th row and j-th row of the query matrix and key matrix, respectively, d denotes the dimensions of the query matrix and key matrix, namely the number of columns, and superscript T means transposition;

on this basis, the multi-head ProbSparse self-attention layer adopts the following calculation formula:

$\text{MultiHead}(Q,K,V) = \text{Concat}(\text{head}_1, \ldots, \text{head}_h)W^O$ $\text{head}_i = \text{Attention}(QW_i^Q, KW_i^K, VW_i^V)$ $i = 1, 2, \ldots, h$ wherein W denotes a linear mapping matrix, different $(W_i^Q, W_i^K, W_i^V)$ map inputs to different spaces, and then mapped matrices are separately used to calculate attention functions and obtain heads; and after attention function outputs calculated by multiple heads are spliced together, the spliced function is mapped to an output through a linear transformation matrix $W^O$.

6. The method according to claim 1, wherein in the step (2), the positional fully-connected feedforward network of the block structure comprises two convolutional layers with a kernel size of 1, wherein the first convolutional layer maps results of the self-attention layer to a feature space of a larger dimension such that the dimension changes to 4×d, and GELU is taken as an activation function; the second convolutional layer restores an output dimension to d; and for each convolutional layer, random inactivation is conducted using dropout, then residual connection is conducted, and finally, normalization is conducted in a LayerNorm layer.

7. The method according to claim 1, wherein in the step (2), the extraction layer of the block structure comprises a one-dimensional convolutional layer and a maximum pooling layer; and after being processed by the extraction layer, an output length of the feature matrix changes to one half of an input length.

8. The method according to claim 7, wherein the extraction layer adopts the following calculation formula:

$$X_{j+1}^t = \text{MaxPool}(ELU(\text{Conv1d}([X_j^t]_{AB})))$$

wherein in this formula, j denotes the number of layers, $[\bullet]_{AB}$ denotes calculation operation through the Multi-Head ProbSparse Self-attention layer, Conv1d(•) denotes one-dimensional convolution in time dimension, with a convolution kernel of 3 in size, ELU(•) denotes an activation function, a stride of maximum pooling is 2, and superscript t denotes the t-th input matrix.

9. The method according to claim 1, wherein in the step (2), a convolution kernel used in the one-dimensional transposed convolutional layer of the feature mapping part has a size of 6, a stride of 4, and a padding of 1, and is able to enlarge a length of a sequence obtained at a preceding stage by 4 times to restore to the size of an original input sequence.

10. The method according to claim 1, wherein in the step (3), the loss function for the training model adopts the following calculation formula:

$$L(x, s) = \frac{1}{T}\sum_{i=1}^{T}(\hat{x}_i - x_i)^2 + D_{KL}\left(\text{softmax}\left(\frac{\hat{x}}{\tau}\right) \Big\| \text{softmax}\left(\frac{x}{\tau}\right)\right) + \frac{1}{T}\sum_{i=1}^{T}\log(1 + \exp(-\hat{s}_i s_i)) + \frac{\lambda}{T}\sum_{i \in O}|\hat{x}_i - x_i|$$

wherein in this formula, $\hat{x}$, $x \in [0,1]$ denote normalized model output and actual power, respectively; $\hat{s}$, $s \in \{-1,1\}$ denote a forecast on-off state and actual state of target equipment; T denotes a time step of a sequence, and O denotes a time step satisfying the condition that the actual on-off state of a load is "on" or the model state forecast goes "wrong", $\tau$ denotes an amplification coefficient which is set to be 0.1; and $\lambda$ denotes a penalty coefficient, and an empirical value is taken according to different loads; and in this calculation formula, the first term is a commonly-used mean square error loss function, the second term is Kullback-Leibler Divergence loss used to measure a difference between a forecast value and an actual value, the third term is penalty for the wrong on-off state forecast, and the last term is L1 term calculated on a time step of a state when equipment is actually turned on or model state forecast goes wrong, which is a penalty term against a smaller forecast value of the model.

11. The method according to claim 1, wherein in the step (4), masking is conducted on input data during model training to force the model to learn and forecast masked data, so as to enhance the capability of the model to capture important modes.

\* \* \* \* \*